United States Patent
Wise

(10) Patent No.: US 9,300,706 B1
(45) Date of Patent: Mar. 29, 2016

(54) DIGITAL PHOTOGRAPH GROUP EDITING AND ACCESS

(71) Applicant: MTN Satellite Communications, Seattle, WA (US)

(72) Inventor: Robert M Wise, Issaquah, WA (US)

(73) Assignee: EMC SatCom Technologies LLC, Miramar, FL (US)

( * ) Notice: Subject to any disclaimer, the term of this patent is extended or adjusted under 35 U.S.C. 154(b) by 4 days.

(21) Appl. No.: 14/449,605

(22) Filed: Aug. 1, 2014

Related U.S. Application Data

(63) Continuation of application No. 14/149,671, filed on Jan. 7, 2014, now Pat. No. 8,824,751.

(60) Provisional application No. 61/749,629, filed on Jan. 7, 2013, provisional application No. 61/750,147, filed on Jan. 8, 2013.

(51) Int. Cl.
| | |
|---|---|
| *G06F 15/16* | (2006.01) |
| *H04L 29/06* | (2006.01) |
| *G06K 9/00* | (2006.01) |
| *G06F 17/30* | (2006.01) |

(52) U.S. Cl.
CPC ........ *H04L 65/403* (2013.01); *G06F 17/30256* (2013.01); *G06K 9/00288* (2013.01)

(58) Field of Classification Search
USPC ............. 709/203, 213, 246, 248; 348/39, 77; 386/200, 224, 297; 382/118
See application file for complete search history.

(56) References Cited

U.S. PATENT DOCUMENTS

| | | | | | |
|---|---|---|---|---|---|
| 7,634,662 | B2 * | 12/2009 | Monroe | ......................... | 713/186 |
| 8,670,597 | B2 * | 3/2014 | Petrou et al. | .................. | 382/116 |
| 8,768,313 | B2 * | 7/2014 | Rodriguez | ................. | 455/414.1 |
| 2009/0324022 | A1 * | 12/2009 | Sangberg et al. | ............. | 382/118 |
| 2011/0013810 | A1 * | 1/2011 | Engstrom et al. | ............. | 382/118 |
| 2011/0052012 | A1 * | 3/2011 | Bambha et al. | ................ | 382/118 |
| 2012/0212668 | A1 * | 8/2012 | Schultz et al. | ................ | 348/468 |
| 2012/0321143 | A1 * | 12/2012 | Krupka et al. | ................ | 382/118 |
| 2013/0290439 | A1 * | 10/2013 | Blom | ............................ | 709/206 |

\* cited by examiner

*Primary Examiner* — Michael Y Won
(74) *Attorney, Agent, or Firm* — FSP LLC

(57) ABSTRACT

A process of managing a digital photo involves capturing the photo using a digital camera; communicating the photo to a server system; the server system identifying faces of people in the photo; the server system matching the faces to the communication addresses of portable devices of the people; and the server system communicating the photo to the portable devices.

16 Claims, 6 Drawing Sheets

DIGITAL PHOTOGRAPH GROUP EDITING AND ACCESS

CROSS REFERENCE TO RELATED APPLICATIONS

This application claims priority under 35 U.S.C. 119 to U.S. provisional application No. 61/749,629, filed on Jan. 7, 2013, and under 35 U.S.C. 119 to U.S. provisional application No. 61/750,147, filed on Jan. 8, 2013, each of which is incorporated herein by reference in its entirety.

BACKGROUND

Digital photography is increasingly popular especially with the inclusion of camera functionality in most wireless telephones and portable music players. A need exists for people to control the recording and distribution of digital pictures that include them.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

Preliminaries

Figure 1:
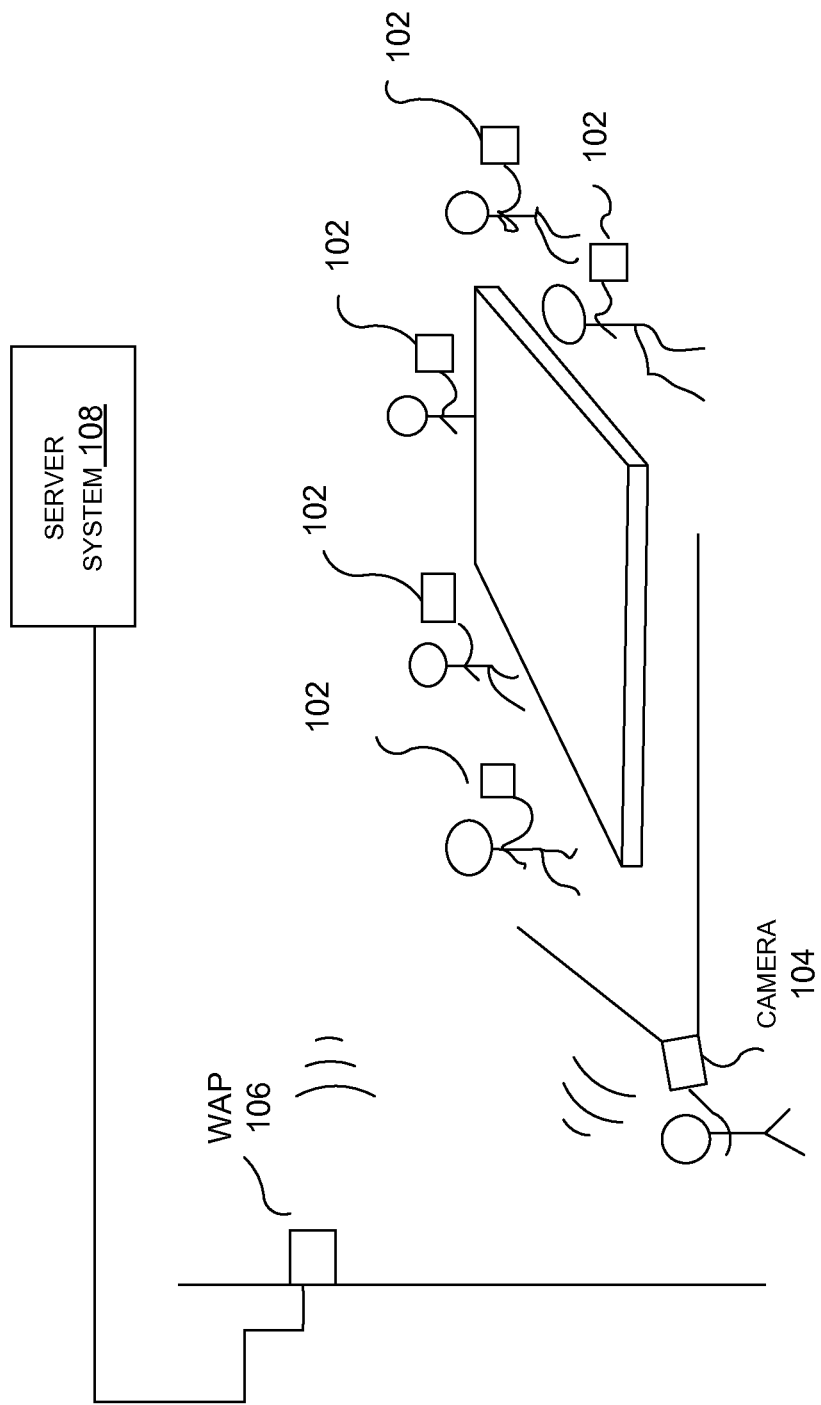
FIG. 1 is an illustration of an embodiment of a photo processing system.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic will vary according to implementation.

GLOSSARY (analog) in this context refers to information encoded in a continuously varying (non quantized or nondiscrete) signal. A continuously variable wave is an example of an analog signal. For example, in the case of wireless phones, analog transmission is where the sound waves of a person's voice are converted directly to specific, continuously-variable characteristics of a radio wave, and vice-versa. Analog signaling is being replaced by digital signaling in most machines and machine networks.

(antenna) in this context refers to A physical device that facilitates the transmission and reception of radio waves. Older phones used external antennas while most current phones use an internal antenna. The size and shape of the antenna is designed according to the type of radio waves being used. Antennas are used in systems such as radio and television broadcasting, point-to-point radio communication, wireless LAN, mobile phones, radar, and spacecraft communication. Antennas come in a variety of shapes and sizes. Some wireless phones contain internal antennas, while others have antennas that extend above the phone. The size and shape of an antenna is carefully designed and tuned to the type of radio wave being transmitted and received.

(application server) in this context refers to logic that provides resources to execute applications and makes features of those applications available to client devices over a network communication channel.

(application) in this context refers to Also, logic that causes a computer to perform tasks beyond the basic operation of the computer itself. The term "application" may be abbreviated in some contexts to simply "app". An application may be logic built upon or integrated with operating system logic. Examples of application logic include enterprise software, accounting software, office suites, graphics software, games, web browsers, and media players. Applications may be bundled with the computer and its system software or published separately. Application logic applies the capabilities of a particular computing platform or system software to a particular purpose. Some applications are available in versions for several different platforms; others have narrower requirements and are thus called, for example, a Geography application for Windows or an Android application for education or Linux gaming. (Operating system (logic)) in this context refers to (ASIC) in this context refers to Application-specific integrated circuit (audio) in this context refers to a representation of sound within a device or a physical storage or communication media, typically as either analog or digital signals (baseband) in this context refers to The original band of frequencies produced by a transducer, such as a microphone, telegraph key, or other signal-initiating device, prior to initial modulation. In wireless voice, the sound frequencies of the voice, before it is encoded and transmitted.

(battery) in this context refers to a device comprising of one or more electrochemical cells (which may be referred to as 'stages') that convert stored chemical energy into electrical energy. a chemical energy source. Rechargeable batteries are revitalized with a charger that usually needs to be plugged into a power source; such as, an electrical outlet or a car cigarette lighter for a recharge.

(BIOS) in this context refers to (Basic Input/Output System), also known as System BIOS, ROM BIOS or PC BIOS is a definition of an interface to input and output devices of a machine. The BIOS are typically initializes and tests the machine I/O components, and loads a bootloader or an operating system from a mass memory device. The BIOS additionally provides abstraction layer for the hardware, i.e. a consistent way for application programs and operating systems to interact with the keyboard, display, and other input/output devices. Variations in the system hardware are hidden by the BIOS from programs that use BIOS services instead of directly accessing the hardware. Many operating systems ignore the abstraction layer provided by the BIOS and access the hardware components directly. The Unified Extensible Firmware Interface (UEFI) is a specification that defines a software interface between an operating system and platform firmware. UEFI is meant to replace the Basic Input/Output System (BIOS) firmware interface.

(BlueTooth) in this context refers to logic for exchanging data over short distances (using short-wavelength radio transmissions in the ISM band from 2400-2480 MHz) from fixed and mobile devices, creating personal area networks (PANs) with high levels of security. Bluetooth is a wireless protocol for exchanging data over short distances from fixed and mobile devices, creating personal area networks. There are two important parameters of Bluetooth devices—class and supported profiles. "Class" signifies the distance at which a Bluetooth connection is possible. Most mobile devices are Class 2, which means they have a range of up to 10 m. Class 1 devices are rare and have a range of up to 100 feet. A "profile" is a type of Bluetooth connection. The most common are the Headset (HSP) and Handsfree (HFP) profiles that enable the device to connect to a wireless headset or handsfree. Some other profiles are OBEX (OBject EXchange) which allows transfer of files, contacts and events; A2DP, which adds support for streaming of stereo sound and AVRC, which allows remote control of playback. Standard IEEE 802.15.1, is a wireless technology standard for exchanging data over short distances (using short-wavelength radio transmissions in the ISM band from 2400-2480 MHz) from fixed and mobile devices, creating for example personal area networks with levels of security.

(bridge) in this context refers to logic to enable two or more communication networks, or two or more network segments, to create an aggregate network. Bridging is distinct from routing which allows the networks to communicate independently as separate networks. A network bridge is a network device that connects multiple network segments.

(browser) in this context refers to logic that is operated by a device to access content and logic provided by Internet sites over a machine network. Browser logic provides a human-friendly interface to locate, access, utilize, and display content and logic encoded by web sites or otherwise available from servers of a network (such as the Internet).

(bus) in this context refers to a collection of coordinated conductors through which data is transmitted from one part of a device to another. You can think of a bus as a highway on which data travels within a computer. The term bus may refer to an internal bus, a bus that connects all the internal computer components to the CPU and main memory. There's also an expansion bus that enables expansion boards to access the CPU and memory. Types of internal busses are the address bus and the data bus. The data bus transfers actual data whereas the address bus transfers information about where the data is located in machine memory. There are also external busses such as USB and Firewire. The size of a bus, known as its width, is important because it determines how much data can be transmitted at one time. For example, a 16-bit bus can transmit 16 bits of data, whereas a 32-bit bus can transmit 32 bits of data. Every bus has a clock speed. A fast bus allows data to be transferred faster, which makes applications run faster.

(camera) in this context refers to a device that records images and/or video, either as analog or as digital information signals. Some mobile devices feature a camera that gives them the ability to work as a digital camera. Often (though not always) the camera is also able to shoot video. The most important characteristics of a camera are the resolution (measured in megapixels), lens focus type (either fixed or automatic) and the presence of a flash. The flash could be either LED (single or even double) or xenon. The number of megapixels is not always a good measurement of the quality of the photos, but if you plan to print pictures, you would generally get higher quality ones out of higher megapixel cameras. Auto focus lens are not a guarantee of better image quality, but fixed focus cameras are usually inferior. Most importantly, only auto focus cameras can allow shooting of really close objects—i.e. macro shooting. Some phones offer optical zoom but those are rare. Most use digital zoom, which degrades the quality of the photo. Cameras that can work in "video mode" are characterized by the maximum resolution and framerate (frames per second or fps) of the recorded video. A camera is a device that includes a light collecting chamber with an aperture fitted with a lens and a shutter through which the image of an object is projected onto a surface for recording (as on film) or for translation into electrical impulses (as for television broadcast).

(cellular network) in this context refers to (mobile network) logic implementing a radio network distributed over land areas called cells, each served by at least one fixed-location transceiver, known as a cell site or base station. In a cellular network, each cell uses a different set of frequencies from neighboring cells, to avoid interference and provide guaranteed bandwidth within each cell. When joined together these cells provide radio coverage over a wide geographic area. This enables a large number of portable transceivers (e.g., mobile phones, pagers, etc.) to communicate with each other and with fixed transceivers and telephones anywhere in the network, via base stations, even if some of the transceivers are moving through more than one cell during transmission.

(client device) in this context refers to any machine that interfaces to a machine network to obtain resources from one or more server systems.

(communication address) in this context refers to a machine code that may be applied to affect machine network routing logic to communicate signals from one machine to another across the network.

(CPU) in this context refers to (Central Processing Unit), an electronic circuit that operates as a main and general purpose execution component for device logic.

(database server) in this context refers to one or more server machines that provide storage and access (queries against) database(s) on behalf of client devices.

(database) in this context refers to an organized collection of data (states of matter representing values, symbols, or control signals to device logic), structured typically into tables that comprise 'rows' and 'columns', although this structure is not implemented in every case. One column of a table is often designated a 'key' for purposes of creating indexes to rapidly search the database.

(display) in this context refers to A output device for visual information. Display technologies, esp. for mobile devices, may include CSTN, TFT, TFD or OLED. There are also types of touchscreen displays, e.g. capacitive and resistive.

(DSP) in this context refers to (Digital Signal Processor)

(email) in this context refers to a form of electronic or optical communications between devices, which takes the form of exchanging messages from an author to one or more recipients. Email communications typically operates across the Internet or other device networks (FPGA) in this context refers to field programmable gate array (gateway) in this context refers to a network device that serves as an interface to another network. Within enterprises, the gateway routes traffic from an internal network (e.g., LAN) to a wide area network such as the Internet. In homes, the gateway may be provided by the ISP that connects the home to the Internet. In enterprises, the gateway node often acts as a proxy server and a firewall.

(hard disk) in this context refers to hard drive.

(HTML) in this context refers to HyperText Markup Language, a standard markup language used to define web pages on the Internet for viewing and interaction with web browsers (image) in this context refers to information captured and stored by a device representing a visual perception, usually a two-dimensional picture. Images may be captured, stored, and communicated by devices in either analog or digital formats.

(infrared) in this context refers to (IR) Infrared is a line-of-sight wireless technology that uses a beam of invisible light to transmit information. This means that the infrared ports of both devices must be nearby and aimed at each other for a connection to succeed. Infrared is the same technology used in most remote controls for home A/V gear such as TVs. Some smartphones are capable of controlling home A/V gear via infrared. Software that mimics a universal remote control is required, which may be included, or may need to be purchased from a third party and downloaded to the phone. In early smartphones, from 2001 to 2007, infrared was also used for two-way exchange of data between phones, or between phones and computers. The main standard for this was IrDA. This functionality was then replaced by Bluetooth, which uses radio waves instead of light. Bluetooth is faster, more reliable, and more versatile than IrDA.

(IP) in this context refers to (Internet Protocol) a primary protocol in the Internet protocol suite designed to enable delivery of data packets from a source device to a destination device based on an address (i.e., an IP address). IP defines datagram structures that encapsulate the data to be delivered. It also defines addressing mechanisms to identify the datagram source and destination devices. IP is the protocol used for communicating data across a packet-switched network used in most publicly accessible networks today. Connections that mobile devices make to GPRS, 3G and similar networks are made using IP.

(keypad) in this context refers to a device including an arrangement of buttons or keys, to act as switches each associated with a symbol. Pressing or activating a key inputs the associated character to an attached device.

(LAN) in this context refers to logic implementing a network that interconnects computers and devices in a defined area such as a home, school, computer laboratory, or office building. LANs, in contrast to wide area networks (WANs), include usually higher data-transfer rates, smaller geographic area, and lack of a need for leased telecommunication lines. Ethernet over twisted pair cabling, and Wi-Fi (Wireless LANs, or WLANs) are two common technologies currently used to build LANs.

(load balancing) in this context refers to a resource cluster and associated logic for distributing workloads across multiple components or communication links. Load balancing may attempt to optimize resource utilization in an even fashion, maximize throughput, minimize response time, and avoid overloads. Because it utilizes multiple components, load balancing may increase reliability through redundancy.

(manifest) in this context refers to logic comprising a machine memory organization identifying one or more of cargo, passengers, and crew of a ship, aircraft, or vehicle. Where such logic is limited to identifying passengers, it is a passenger manifest; conversely, such logic limited to identifying cargo is a cargo manifest.

(media) in this context refers to objects on which data can be stored. These include hard disks, floppy disks, CD-ROMs, and tapes. (2) In computer networks, media refers to the cables linking workstations together. There are many different types of transmission media, the most popular being twisted-pair wire (normal electrical wire), coaxial cable (the type of cable used for cable television), and fiber optic cable (cables made out of glass). (3) The form and technology used to communicate information. Multimedia presentations, for example, combine sound, pictures, and videos, all of which are different types of media.

(memory) in this context refers to a device having a machine interface and storing data in the form of an altered material/energy configuration. Two common types of device memory are SAM, or Sequential Access Memory and RAM, or Random Access Memory. Data on SAM devices is read and written in a sequence, while data on a RAM device is read or written in any order. Examples of SAM devices include CD-ROMS and magnetic tape. RAM devices include flash drives and solid state hard drives. RAM is usually faster than SAM.

Other examples of device memory are hard drives, flash drives, optical discs and RAM chips.

(memory) in this context refers to a device having a machine interface and storing data in the form of an altered material/energy configuration. Two common types of device memory are SAM, or Sequential Access Memory and RAM, or Random Access Memory. Data on SAM devices is read and written in a sequence, while data on a RAM device is read or written in any order. Examples of SAM devices include CD-ROMS and magnetic tape. RAM devices include flash drives and solid state hard drives. RAM is usually faster than SAM. Other examples of device memory are hard drives, flash drives, optical discs and RAM chips.

(microphone) in this context refers to Also, an acoustic-to-electric transducer or sensor that converts sound into an electrical signal. Many microphones use electromagnetic induction (dynamic microphone), capacitance change (condenser microphone), piezoelectric generation, or light modulation to produce an electrical voltage signal from mechanical vibration a device that converts vibrations in a physical medium (e.g., air) into electromagnetic signals (e.g., electrical signals)

(mobile device) in this context refers to any device that includes logic to communicate over a machine network and having a form factor compatible with being carried conveniently by a single human operator. Mobile devices typically have wireless communications capability via WAPs or cellular networks.

(modem) in this context refers to (modulator-demodulator) a device that modulates a carrier signal to encode digital information, and also demodulates such a carrier signal to decode the transmitted information.

(OS) in this context refers to logic that manages device hardware resources and provides common services for application logic. The operating system is a component of many devices, such as computers and mobile phones. Application logic usually requires an operating system in order to function. Operating systems typically manage utilization of device resources, such as I/O devices, displays, processor utilization, memory, mass storage, and printing. The operating system acts as an intermediary between applications and the hardware resources, although applications are often (though not always, in the case of virtual machines) executed directly by the device hardware (e.g., one or more CPUs) and will frequently make system calls to the operating system, or be interrupted by it. Operating systems can be found on almost any device that contains a programmable processor or controller, from cellular phones and video game consoles to supercomputers and web servers.

(post) in this context refers to the act of making media available to a machine user interface over a network, as in "the photo was posted on social media"

(processor) in this context refers to any circuit or virtual circuit (a physical circuit emulated by logic executing on an actual processor) that manipulates data values according to control signals (e.g., 'commands', 'op codes', 'machine code', etc.) and which produces corresponding output signals that are applied to operate a machine.

(RAM) in this context refers to (Random-Access Memory) a type of memory that is fast relative to other (e.g., nonvolatile) memory is a device, but is volatile, meaning stored information is lost when electric power is removed. RAM is also typically freely addressable, meaning addressability is not constrained to block or sequential access. For these reasons, it is useful only for temporary storage of data that requires fast access. A device will typically have RAM and some kind nonvolatile memory to store a copy of all logic (i.e., 'code' and 'data') that needs to be maintained when the device is powered off or that specific logic is not executing on the device. Both the OS and application software typically use RAM.

(RF) in this context refers to (radio frequency) a rate of oscillation in the range of about 3 kHz to 300 GHz, which corresponds to the frequency of electromagnetic radio waves, and the alternating currents which carry radio signals. RF usually refers to electrical rather than mechanical oscillations, although mechanical RF systems do exist Radio Frequency RF can refer to anything related to radio signals, which are invisible electromagnetic waves created by applying a pulsing electric current to an antenna. "RF" generally refers to the radio waves themselves, or systems that handle radio signals directly, such as the circuits connected directly to the antenna. Technically, RF is the 10 kHz to 300 GHz frequency range of the electromagnetic spectrum that can be used for wireless communication known as radio.

(ROM) in this context refers to device memory containing data that normally can only be read, not written to. Unlike a computer's random access memory (RAM), the data in ROM is not lost when the computer power is turned off. The data on the ROM can usually be loaded into the RAM if needed. "Read-only memory" may in fact be writable memory, but the process of writing data is comparatively slow and infrequent as compared to RAM, and often does not permit the addressing flexibility that RAM does.

(router) in this context refers to logic that distributes digital information that is contained within a data packet. Each data packet contains address information that a router can use to determine if the source and destination are on the same network, or if the data packet must be transferred from one network to another. This transfer to another type of network is achieved by encapsulating the data with network specific protocol header information. When multiple routers are used in a large collection of interconnected networks, the routers exchange information about target system addresses, so that each router can build up a table showing the preferred paths between any two systems on the interconnected networks.

(sensor) in this context refers to a device or composition of matter that responds to a physical stimulus (as heat, light, sound, pressure, magnetism, or a particular motion) and transmits a resulting impulse (as for measurement or operating a control)

(server) in this context refers to logic designed to respond to requests for functionality from client logic that interacts with the server logic via a request/response model, often over a network. Thus, the server performs some operation utilizing the underlying resources of the device or devices hosting the server, on behalf of clients (request submitters). The client logic either executes on the same device or devices as the server logic, or interacts with the server logic through a machine data network.

(social media) in this context refers to logic to define and enable interactions among people in which they create, share, and exchange information and ideas in virtual communities and networks. Social media utilizes mobile and web-based technologies to create highly interactive platforms through which individuals and communities share, co-create, discuss, and modify user-generated content.

(speaker) in this context refers to Also, an electroacoustic transducer that produces sound in response to an electrical or optical audio signal input a device that converts signals output from a device into vibrations in a physical medium, usually the air (transducer) in this context refers to a device that converts a signal in one form of energy to another form of energy. [1] Energy types include (but are not limited to) electrical, mechanical, electromagnetic (including light), chemical, acoustic and thermal energy. While the term transducer commonly implies the use of a sensor/detector, any device which converts energy can be considered a transducer. Transducers are widely used in measuring instruments.

(USB) in this context refers to Also, USB is a standard for a wired connection between two electronic devices, including a mobile phone and a desktop computer. The connection is made by a cable that has a connector at either end. One end, the one that plugs into the computer, is the same across all USB cables while the one that plugs into the mobile device can be of various types such as miniUSB, microUSB or a proprietary connector. USB version 1.1 provides maximum speeds of up to 1.5 MB/s while the current version 2.0 is about 40 times faster. The versions are backwards compatible and the speed is limited by the slower device. Transferring data may require drivers to be installed on the desktop computer but some phones offer "mass storage" mode which means they appear as thumb drives to the computer and no special drivers are needed. In addition to their data transferring application, USB cables also carry an electric charge that can be used to power peripherals (such as USB mice or keyboards), and many mobile phones can be charged through their USB port. Universal Serial Bus (USB) is an industry standard developed in the mid-1990s that defines the cables, connectors and communications protocols used in a bus for connection, communication and power supply between computers and electronic devices, including mobile devices. USB was designed to standardize the connection of computer peripherals (including keyboards, pointing devices, digital cameras, printers, portable media players, disk drives and network adapters) to personal computers, both to communicate and to supply electric power. It has become commonplace on other devices, such as smartphones, PDAs and video game consoles. USB has effectively replaced a variety of earlier interfaces, such as serial and parallel ports, as well as separate power chargers for portable devices.

(video) in this context refers to information captured and stored by a device representing a sequence of moving pictures. Video may be captured, stored, and communicated by devices in either analog or digital formats. (1) Refers to recording, manipulating, and displaying moving images, especially in a format that can be presented on a television. (2) Refers to displaying images and text on a computer monitor or mobile device. The video adapter, for example, is responsible for sending signals to the display device.(n.) A recording produced with a video recorder (camcorder) or some other device that captures full motion (WAN) in this context refers to (Wide Area Network) a network that provides data communications to a larger number of users than are usually served by a local area network (LAN) and is usually spread over a larger geographic area than that of a LAN. Logic implementing a network that covers a broad area (e.g., a telecommunications network that links across metropolitan, regional, or national boundaries) using private or public network transports. Business and government entities utilize WANs to relay data among employees, clients, buyers, and suppliers from various geographical locations. The Internet can be considered a WAN.

(WAP) in this context refers to Also, Wireless Application Protocol, a technology designed to allow efficient transmission of optimized Internet content and logic to mobile devices such as mobile phones. In practical terms, this involves web sites designed specifically to be rendered on phones or other devices with small displays and, relative to devices such as desktop or personal computers, limited bandwidth to the Internet. WAP is an international standard for applications that use wireless communication. Its most common application is to enable access to the Internet from a mobile phone or a PDA. WAP sites are websites written in or converted to WML (Wireless Markup Language) and accessed via the WAP browser. (wireless access point) a device that makes a wireless interface to a network available to client devices. Examples of wireless network access points are WiFi "hotspots" and 3G and 4G cellular hotspotsa wireless access point, a device or system including radio transceivers that convert digital information to and from radio signals that can be exchanged with other wireless communication devices. The most basic forms of wireless access points simply for wireless connections. A wireless access point that includes the ability of DHCP and network address translation (NAT) is typically called a wireless gateway.

(web server) in this context refers to a device or device system that delivers web pages in response to requests for the web pages from web browsers. Also, logic to communicate web pages at the request of clients, most typically using the Hypertext Transfer Protocol (HTTP). The server communicates HTML documents and any additional content that may be included by a document, such as images, style sheets and scripts, as well as content referenced by certain types of links (pointers) in the web pages. A user agent, commonly a web browser or web crawler, initiates communication with the web server by making a request for a resource using (typically) HTTP, and the server responds with the content of that resource or an error message if unable to do so. The resource is typically a file on the server's secondary storage, but this is not necessarily the case. Many web servers have a capability of receiving content from clients. This feature is used for submitting web forms, including uploading of files.

(web server) in this context refers to a device or device system that delivers web pages in response to requests for the web pages from web browsers. Also, logic to communicate web pages at the request of clients, most typically using the Hypertext Transfer Protocol (HTTP). The server communicates HTML documents and any additional content that may be included by a document, such as images, style sheets and scripts, as well as content referenced by certain types of links (pointers) in the web pages. A user agent, commonly a web browser or web crawler, initiates communication with the web server by making a request for a resource using (typically) HTTP, and the server responds with the content of that resource or an error message if unable to do so. The resource is typically a file on the server's secondary storage, but this is not necessarily the case. Many web servers have a capability of receiving content from clients. This feature is used for submitting web forms, including uploading of files.

(WML) in this context refers to Wireless Markup Language An industry-standard markup language for creating special, small web sites optimized for phones. WML was a core feature of the WAP 1.x standard. WML has generally been phased out in favor of the newer xHTML standard, part of WAP 2.0. Most phones support both WAP 1.x (WML and WAP 2.0 (XHTML). Older phones may only support WAP 1.x (WML) sites.

(XML) in this context refers to eXtensible Markup Language A standard that forms the basis for most modern markup languages. XML is an extremely flexible format that only defines "ground rules" for other languages that define a format for structured data designed to be interpreted by software on devices. XML by itself is not a data format. Examples of XML-based standards include xHTML, for creating web pages, RSS, for feeds of new information (such as news headlines), and SyncML, for managing personal data such as contacts, email, files, and events. Some phones feature a camera that gives them the ability to work as a digital camera. Often (though not always) the camera is also able to shoot video. The most important characteristics of a camera are the resolution (measured in megapixels), lens focus type (either fixed or automatic) and the presence of a flash. The flash could be either LED (single or even double) or xenon. The number of megapixels is not always a good measurement of the quality of the photos, but if you plan to print pictures, you would generally get higher quality ones out of higher megapixel cameras. Auto focus lens are not a guarantee of better image quality, but fixed focus cameras are usually inferior. Most importantly, only auto focus cameras can allow shooting of really close objects—i.e. macro shooting. Some phones offer optical zoom but those are rare. Most use digital zoom, which degrades the quality of the photo. Cameras that can work in "video mode" are characterized by the maximum resolution and framerate (frames per second or fps) of the recorded video a device that includes a light collecting chamber with an aperture fitted with a lens and a shutter through which the image of an object is projected onto a surface for recording (as on film) or for translation into electrical impulses (as for television broadcast)

logic that can be independently installed, accessed, and removed from a device, and which executes at lower permission levels and within confines as to functionality and device resource utilization as determined by operating system software. Often referred to as "regular" application logic, as opposed to driver, applet, or system logic.

DESCRIPTION

Herein the term 'photo' is synonymous with 'digital image' or just 'image'. The term 'portable device' is synonymous with 'mobile device', which is a type of 'client device'.

Described herein is a system and process for managing a digital photo. In the system, a camera captures a photo of a group of people. The photo is communicated to a server system, which identifies the faces of people in the photo. The server system matches the faces to the communication addresses of portable devices of the people, or to the people themselves. The server system communicates the photo to the portable devices, and then receives votes from the portable devices approving or disapproving of the photo. (People often don't like how they look in photos).

The server system will post the photo to the social media accounts of people corresponding to votes from the portable devices approving of the photo. A correlation of people, facial representations of people, communication addresses (e.g., phone numbers or email addresses), and access credentials for their social media account may be associated in machine memory organizations represented as tables in a database server system. (e.g., comprising a DBMS). The correlation may be made via a memory organization representing a passenger manifest on a vehicle such as a cruise ship, bus, airplane, or train.

The server system may decline to post the photo to the social media accounts of people corresponding to votes from the portable devices disapproving of the photo. The server system may apply vehicle manifest logic to locate and correlate people's faces to faces in the photo based on the manifest. The manifest logic may include facial photos of people on the vehicle. The manifest logic may include communication addresses associated with people on the vehicle and/or their mobile devices. The manifest logic may include one of phone numbers or email addresses associated with people on the vehicle. Each person identified in the photo may be granted a right to edit a region of the photo identified by the server system as containing an image of the person, for example by providing a photo of the group to their mobile device for review only, and a photo of a subregion of the group photo in which the person appears, for editing and accepting back to the server for merging back into the group photo. The server system may post the photo to the social media accounts of people corresponding to votes from the portable devices approving of the photo, but only on condition that a number of votes of approving of the photo exceeds a defined threshold less than the total number of people identified in the photo. The server system may post the photo to the social media accounts of people corresponding to votes from the portable devices approving of the photo, but declining to tag those people in the photo who did not submit a vote of approval for the photo.

FIG. 1 illustrates a system for processing a digital photo. A wireless (e.g., WiFi) enabled camera 104 captures a photo of a group of people in a location. The location can be identified by a proximate wireless access point 106, GPS coordinates, or by recognition of environmental cues, for example. A photo taken with the camera is communicated at least partially over wireless channels to a server system 108. The server system 108 checks a vehicle or other location manifest (e.g., a list of attendees in a meeting) and locates and identifies people's faces in the photo based on the manifest. To facilitate this process, the manifest may include facial photos of the people on the manifest, or may contain other identifying information such as age, hair color, eye color, gender, etc. If a person is recognized in the photo, the photo is communicated to a portable wireless device 102 associated with that person. Thus, the photo may be communicated to multiple people that are identified in the photo.

Figure 2:
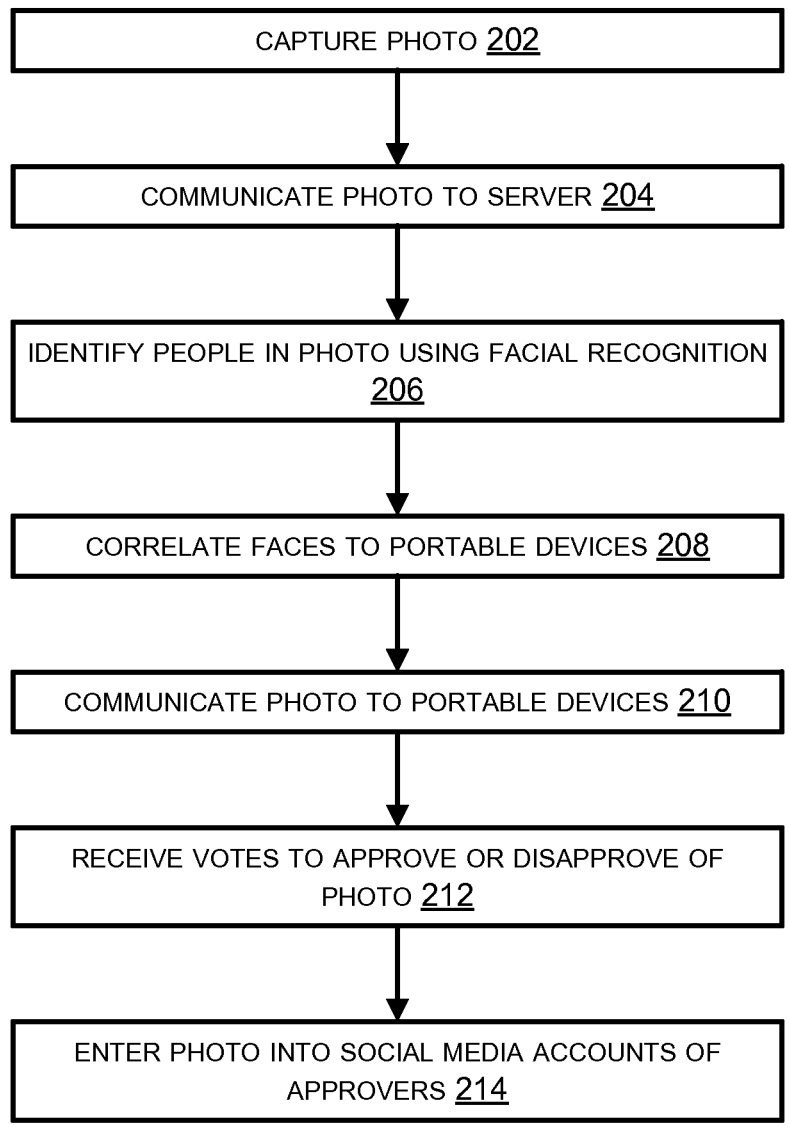
FIG. 2 is a flow chart of a process embodiment for processing a digital photo.

FIG. 2 is an illustration of a process for processing a digital photo. A photo is captured by a camera 104 and communicated to a server system 108 (202, 204) via a WAP 106. People in the photo are identified and each correlated to mobile devices 102 of the identified people (206, 208) e.g., via phone numbers, or correlated to the people themselves, e.g. via email addresses. The photos are communicated to those mobile devices 102 (210). Each of the people identified in the photo gain the right to edit a region of the photo identified by the server system as containing the person's image. Each person in the photo can vote on approving or declining the photo, and those votes are sent from the mobile devices 102 to the server system 108 either via the WAP 106, or via a cellular network (212). Voting methodology may be enforced, for example, if two thirds of the people vote to approve the photo, in which case it may be entered into their social media account (214) (either a global account, or a local account that is later merged into their global social media account). Or, it may be offered for purchase to those who approved it.

If however a threshold of people identified in the photo decline to approve it, the photo will not be entered into the social media accounts of the declining people, or anyone else in the photo, even if they approve it. If a threshold of people in the photo approve it, the photo may be entered into their social media accounts but the people who decline the photo will not be checked in as being in attendance with those people (e.g., they won't be "tagged" in the photo). One embodiment enables people who decline the photo to have their image digitally removed from the photo before it's posted to the social media accounts who have accepted the photo. This may be done by replacing pixels in the image corresponding to a subregion of the photo where the disapproving person appears, using known techniques.

In one embodiment, some people located in a photo are identified as being in the foreground of the photo or as otherwise belonging in the photo, as opposed to people unintentionally in the photo. For example, looking into the camera as opposed to looking away, perhaps in combination with a posture of walking past the camera or standing in the background, might identify a person as belonging in the photo or not. "Background people" who are not intentionally in the photo are not contacted, even if their faces are or could be recognized. They are not provided with a copy of the photo nor are they associated with the people in the photo for purposes of social media recording.

Figure 3:
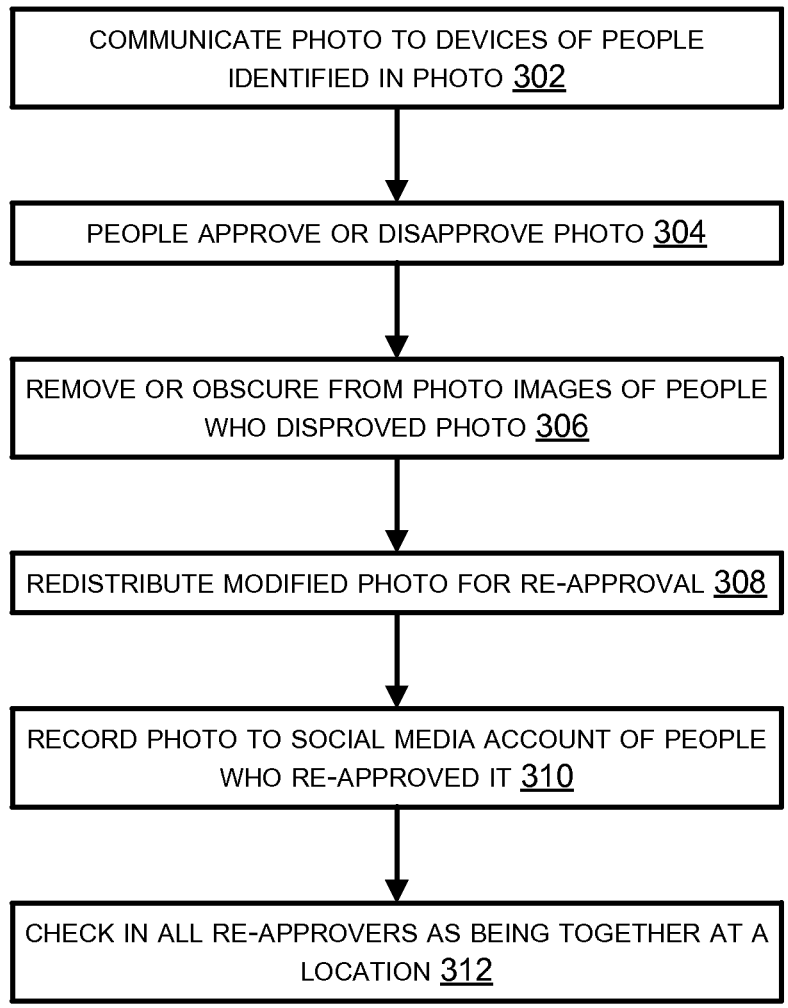
FIG. 3 is a flow chart of a process embodiment for processing a digital photo.

FIG. 3 is an illustration of a process for processing a digital photo. The photo is communicated to mobile devices of people identified in photo 302. In a voting-approval type implementation, a majority of the people in the photo or some number above a threshold would have to approve of the photo (304) before it would be retained or recorded on social media. Otherwise a message may be returned to the camera which captures the photo, and/or to the mobile devices of the people in the photo, indicating the photo was declined and a new photo should be taken. In one embodiment, people have the option of disproving their own appearances in the photos, so that they may be removed from the photo or obscured in it if they disapprove (306).

The people who approve the photo are retained in it, and a new photo showing everyone who approved of the photo (and those who disapproved removed or obscured) may be distributed to the communication devices of the approvers for re-approval (308), but not to the devices of the people who disapprove of the original photo. In the new photo the people who disapproved are digitally obscured or removed from the photo, and the photo posted to the social media accounts of the approvers (310). All approvers may be "checked in" (a social media action on content, known in the art) as being together at a location (312).

Figure 4:
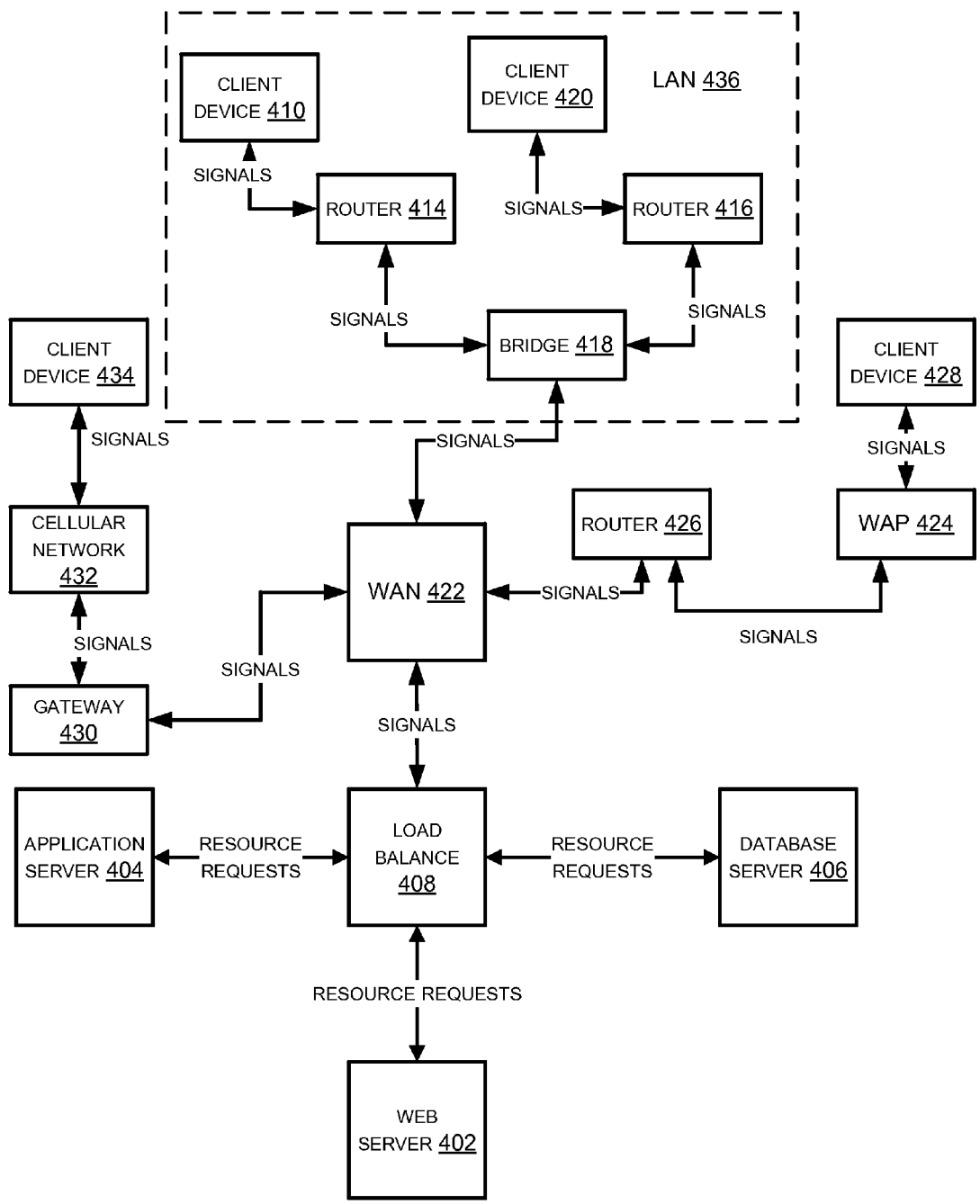
FIG. 4 is a machine network embodiment for implementing an embodiment of a photo processing system.

FIG. 4 illustrates the exemplary of an embodiment a machine system for providing network resources to client devices. Several network access technologies between client devices and server resources are illustrated, including cellular network 432, LAN 436, and WAP 424. Signals representing server resource requests are output from client devices 410, 420, 428>, and 434 to the various access networks, from which they are propagated to a WAN 422 (e.g., the Internet) and from there to a server system. These signals are typically encoded into standard protocols such as Internet Protocol (IP), TCP/IP, and HTTP. When the clients are part of a LAN 436, the signals may be propagated via one or more router 414 416 and a bridge 418. A router 426 may propagate signals from the WAP 424 to the WAN 422. A gateway 430 may propagate signals from the cellular network 432 to the WAN 422. The server system inn this example comprises a number of separate server devices, typically each implemented in the separated machine, although this is not necessarily the case. The signals from the client devices are provided via a load balancing server 408 to one or more application server 404 (e.g., photo processing server) and one or more database server 416. Load balancing server 408 maintains an even load distribution to the other server, including web server 402, application server 404, and database service 406. Each server in the drawing may represent in effect multiple servers of that type. The signals influence one or more processors of the application server 404 to produce a signal indicative of received photos and votes on photos. For example, signals from a client device and indicative of a photo may be applied to the application server's processor and memory internal devices to influence the production of passenger identifier signals for people represented in the photo. Database service 406 may provide signals in response to resource request indicative of a passenger manifest. The signals applied to the database server 406 may cause the database server 406 to access and certain memory addresses, which correlates to certain rows and columns in a memory device. These signals from the database server 406 may also be applied to application server 404 via the load balancing server 408 to influence the computation of a signal representing a client device of a person identified in the photo. The signals representing photos, passenger facial photos, manifest information, etc. are applied by the application server 404, via the load balancing server 408, to the web server 402, which in turn communicates information to a client device (such as received photos), and receives signals from the client device indicative of, for example, votes. The photo processing system may thus be implemented as devices coordinated on a LAN, or over a wide geographical area utilizing a WAN or cellular network, or over a limited area (room or house or store/bar) utilizing a WAP. Photo viewing and voting logic may be implemented, for example, as an application (app) on a mobile phone coordinated wirelessly (e.g., Bluetooth) with a local device (e.g., laptop), or as a BlueTooth or other short range RF device signaling a WAP of a LAN or hotspot. The photo processing service may be implemented as a pure or hybrid peer to peer system in a local or widely distributed area.

Figure 5:
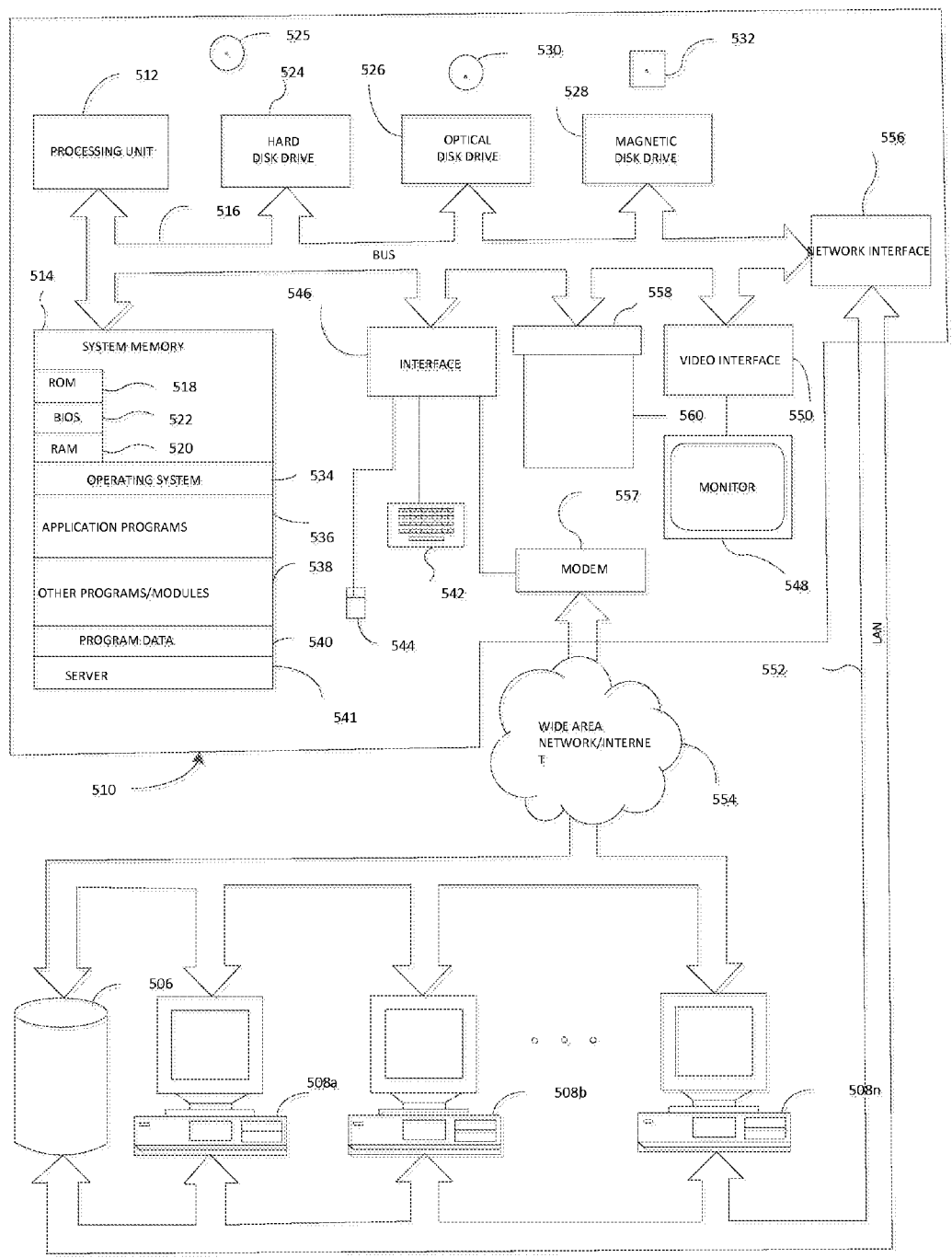
FIG. 5 is a server system embodiment for implementing an embodiment of a photo processing system.

FIG. 5 illustrates an embodiment of a computer system machine and a machine communication network. The computer system 500 may implement a photo processing server as described herein. A particular computer system 500 of the network may include one or more processing units 512*a*, 512*b* (collectively 512), a system memory 514 and a system bus 516 that couples various system components including the system memory 514 to the processing units 512. The processing units 512 may be any logic processing unit, such as one or more central processing units (CPUs) 512*a*, digital signal processors (DSPs) 512*b*, application-specific integrated circuits (ASICs), field programmable gate arrays (FPGAs), etc. The system bus 516 can employ any known bus structures or architectures, including a memory bus with memory controller, a peripheral bus, and a local bus. The system memory 514 includes read-only memory (ROM) 518 and random access memory (RAM) 520. A basic input/output system (BIOS) 522, which can form part of the ROM 518, contains basic routines that help transfer information between elements within the computer system 500, such as during start-up.

The computer system 500 may also include a plurality of interfaces such as network interface 560, interface 550 supporting modem 562 or any other wireless/wired interfaces.

The computer system 500 may include a hard disk drive 524 for reading from and writing to a hard disk 526, an optical disk drive 528 for reading from and writing to removable optical disks 532, and/or a magnetic disk drive 530 for reading from and writing to magnetic disks 534. The optical disk 532 can be a CD-ROM, while the magnetic disk 534 can be a magnetic floppy disk or diskette. The hard disk drive 524, optical disk drive 528 and magnetic disk drive 530 may communicate with the processing unit 512 via the system bus 516. The hard disk drive 524, optical disk drive 528 and magnetic disk drive 530 may include interfaces or controllers (not shown) coupled between such drives and the system bus 516, as is known by those skilled in the relevant art. The drives 524, 528 and 230, and their associated computer-readable storage media 526, 532, 534, may provide non-volatile and non-transitory storage of computer readable instructions, data structures, program modules and other data for the computer system 500. Although the depicted computer system 500 is illustrated employing a hard disk 524, optical disk 528 and magnetic disk 530, those skilled in the relevant art will appreciate that other types of computer-readable storage media that can store data accessible by a computer may be employed, such as magnetic cassettes, flash memory, digital video disks (DVD), Bernoulli cartridges, RAMs, ROMs, smart cards, etc. For example, computer-readable storage media may include, but is not limited to, random access memory (RAM), read-only memory (ROM), electrically erasable programmable read-only memory (EEPROM), flash memory, compact disc ROM (CD-ROM), digital versatile disks (DVD) or other optical disk storage, magnetic cassettes, magnetic tape, magnetic disk storage or other magnetic storage devices, solid state memory or any other medium which can be used to store the desired information and which may be accessed by processing unit 512*a*.

Program modules can be stored in the system memory 514, such as an operating system 536, one or more application programs 538, other programs or modules 540 and program data 542. Application programs 538 may include instructions that cause the processor(s) 512 to automatically provide dynamic selection of data and telecommunication service providers before or during communications between various devices such as, for example, a mobile device and a landline telephone. Other program modules 540 may include instructions for handling security such as password or other access protection and communications encryption. The system memory 514 may also include communications programs, for example, a Web client or browser 544 for permitting the computer system 500 to access and exchange data with sources such as Web sites of the Internet, corporate intranets, extranets, or other networks and devices as described herein, as well as other server applications on server computing systems. The browser 544 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of Web clients or browsers are commercially available such as those from Mozilla, Google, and Microsoft.

Although illustrated as being stored in the system memory 514, the operating system 536, application programs 538, other programs/modules 540, program data 542 and browser 544 can be stored on the hard disk 526 of the hard disk drive 524, the optical disk 532 of the optical disk drive 528 and/or the magnetic disk 534 of the magnetic disk drive 530.

An operator can enter commands and information into the computer system 500 through input devices such as a touch screen or keyboard 546 and/or a pointing device such as a mouse 548, and/or via a graphical user interface. Other input devices can include a microphone, joystick, game pad, tablet, scanner, etc. These and other input devices are connected to one or more of the processing units 512 through an interface 550 such as a serial port interface that couples to the system bus 516, although other interfaces such as a parallel port, a game port or a wireless interface or a universal serial bus (USB) can be used. A monitor 552 or other display device is coupled to the system bus 516 via a video interface 254, such as a video adapter. The computer system 500 can include other output devices, such as speakers, printers, etc.

The computer system 500 can operate in a networked environment using logical connections to one or more remote computers and/or devices. For example, the computer system 500 can operate in a networked environment using logical connections to one or more mobile devices, landline telephones and other service providers or information servers. Communications may be via a wired and/or wireless network architecture, for instance wired and wireless enterprise-wide computer networks, intranets, extranets, telecommunications networks, cellular networks, paging networks, and other mobile networks.

Figure 6:
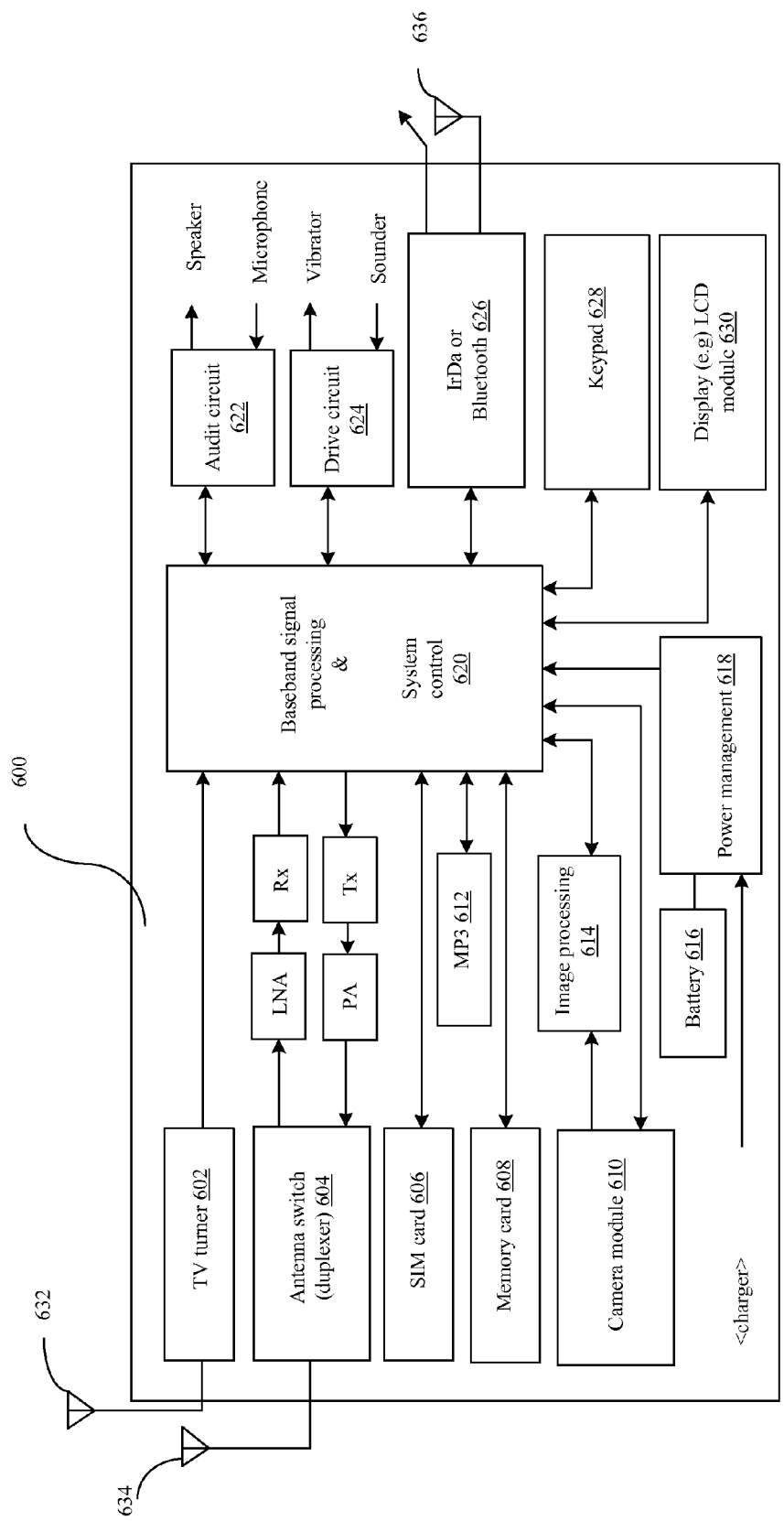
FIG. 6 is a mobile device embodiment for implementing an embodiment of a photo processing system.

FIG. 6 illustrates an embodiment of a mobile device 600 that may implement a machine having features described herein, for example a cell phone device to receive photos and provide voting signals to the photo processing system. Logic 620 provides device system control over other components and coordination between those components as well as baseband signal processing for the device. Baseband signal processing extracts baseband signals from the radio frequency signals received by the device, and processes baseband signals up to radio frequency signals for communications transmitted from the device. Logic 620 may comprise a central processing unit, digital signal processor, and/or one or more controllers or combinations above these components. The device may further comprise memory card 608 which may be utilized to add and remove machine memory for use by the central processors, digital signal processors in controllers of the systems logic 620.

Radio frequency signals are received and transmitted by the device using an antenna 634 coupled to antenna switch 604. Received signals may be communicated from the antenna switch 604 through a low noise amplifier to the logic 620. Signals for transmission from logic 620 may be communicated to a power amplifier and from there to antenna switch 604 for transmission through the antenna 634.

A subscriber identity module (SIM) card 606 may be present in some mobile devices, especially those operated on the Global System for Mobile Communication (GSM) network. The SIM card 606 stores, in machine-readable memory, personal information of a mobile service subscriber, such as the subscriber's cell phone number, address book, text messages, and other personal data. A user of the device can move the SIM card to a different mobile device 600 and maintain access to their personal information. A SIM card typically has a unique number which identifies the subscriber to the wireless network service provider.

A camera module 610 may interface to a camera device to capture images and video from the environment. These images and video are provided to an image processing module 614 and from there to the central control logic 420 for processing. Images, video and other display information, for example, user interface optical patterns, may be output to a display module 630 which may for example operate as a liquid crystal display or may utilize other optical output technology. The display module 630 may also operate as a user input device, being touch sensitive where contact or close contact by a use's finger or other device handled by the user may be detected by transducers. An area of contact or proximity to the display module 630 may also be detected by transducers and this information may be supplied to the control logic 620 to affect the internal operation of the mobile device 600 and to influence control and operation of its various components.

The mobile device 600 may include an MP3 decoder 612 for decoding digital music files or audio files stored on memory card 608 or received in real time via antenna 634. The MP3 decoder 612 is operated by the logic 620 and decoded audio is provided to an audio circuit 622 from which is output to one and more speakers to create pressure waves in the external environment representing the encoded audio in the MP3 file or stream.

The mobile device 600 may operate on power received from a battery 616. The battery capability and energy supply may be managed by a power management module 618.

Another user interface device operated by control logic 620 is a keypad 628 which responds to pressure or contact events by a user of the device. As noted the keypad may in some cases be implemented by transducers of the display module 630.

The mobile device 600 may generate short range wireless signals to influence other devices in its proximity, and may receive wireless signals from those proximate devices using antenna 636. Short range radio signals may influence the device, or be generated by the device for output to the environment, through a BlueTooth module 626. Other forms of electromagnetic radiation may be used to interact with proximate devices, such as IRDA (infrared signals). The device may utilize a haptic drive circuit 624 which provides vibrations in response to events identified by control logic 620, such as the received text messages, emails, incoming calls or other events that require the user or the device's attention.

The mobile device 600 may convert audio phenomenon from the environment into internal electro or optical signals by using microphone and the audio module 622. The mobile device 600 may receive television signals using a TV tuner 602 coupled to a television antenna 632.

Implementations and Alternatives

The techniques and procedures described herein may be implemented via logic distributed in one or more computing devices. The particular distribution and choice of logic may vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components Likewise, any two components so associated can also be viewed as being "operably connected", or "operably coupled", to each other to achieve the desired functionality.

What is claimed is:

1. A process of managing a digital photo, comprising:
capturing a photo using a digital camera;
communicating the photo to a server system;
the server system identifying faces of people in the photo;
the server system matching the faces of people in the photo to communication addresses of portable devices;
the server system communicating the photo to portable devices corresponding to the communication addresses of portable devices;
the server system receiving votes from the portable devices approving or disapproving of the photo; and
the server system posting the photo only to social media accounts of people corresponding to portable devices submitting votes approving of the photo.

2. The process of claim 1, further comprising:
the server system declining to post the photo to the social media accounts of the people corresponding to portable devices submitting votes disapproving of the photo.

3. The process of claim 1, further comprising:
the server system applying vehicle manifest logic to locate and correlate the people corresponding to portable devices to the faces of people in the photo.

4. The process of claim 3, further comprising:
the vehicle manifest logic comprising facial photos of vehicle passengers.

5. The process of claim 4, further comprising:
manifest logic comprising the communication addresses of portable devices and an association of the communication addresses of portable devices, the portable devices, and the vehicle passengers.

6. The process of claim 5, further comprising:
the manifest logic comprising one of phone numbers or email addresses associated with the vehicle passengers or the portable devices.

7. The process of claim 1, further comprising:
the server system granting a right to edit a corresponding region of the photo to a corresponding person of the people corresponding to portable devices, the corresponding region of the photo corresponding to a region of the photo comprising a facial representation of the corresponding person.

8. The process of claim 1, further comprising:
the server system posting the photo to the social media accounts of the people corresponding to portable devices submitting the votes approving of the photo only on condition that a number of votes approving of the photo exceeds a defined threshold less than a total number of the people corresponding to portable devices.

9. The process of claim 8, further comprising:
the server system posting the photo to the social media accounts of the people corresponding to portable devices submitting the votes approving of the photo but declining to tag the posting on the social media accounts with an identification of the people corresponding to portable devices submitting votes disapproving of the photo.

10. The process of claim 1, further comprising:
the server system digitally removing the faces of people in the photo of the people corresponding to portable devices submitting votes disapproving of the photo.

11. A server system for processing digital photos, comprising:
logic to interface to a machine communication network;
logic to receive a digital photo via the logic to interface to the machine communication network;
logic to identify faces of people in the photo;
logic to match the faces of people in the photo to communication addresses of portable devices;
logic to communicate the photo to portable devices associated with the communication addresses of portable devices;
logic to receive and tabulate votes from the portable devices approving or disapproving of the photo; and
logic to post the photo to social media accounts of people corresponding to the portable devices submitting the votes from the portable devices approving of the photo.

12. The server system of claim 11, further comprising:
logic to decline to post the photo to the social media accounts of people corresponding to the portable devices submitting the votes from the portable devices disapproving of the photo.

13. The server system of claim 11, further comprising:
logic to apply vehicle manifest logic to correlate the faces of people in the photo to the portable devices.

14. The server system of claim 13, further comprising:
manifest logic comprising facial photos of vehicle passengers and correlations of the vehicle passengers to the portable devices.

15. The server system of claim 14, further comprising:
the manifest logic comprising the communication addresses of portable devices.

16. The server system of claim 11, further comprising:
logic to digitally remove from the photo the faces of people in the photo corresponding to the portable devices submitting the votes from the portable devices disapproving of the photo.

* * * * *